Nov. 12, 1968  E. M. PRIEST  3,410,337
RECEPTACLE FOR TEMPERATURE-CONDITIONING FOOD, DRINK AND
THE LIKE BY REMOTELY INITIATED MEANS
Filed Aug. 20, 1965  2 Sheets-Sheet 1
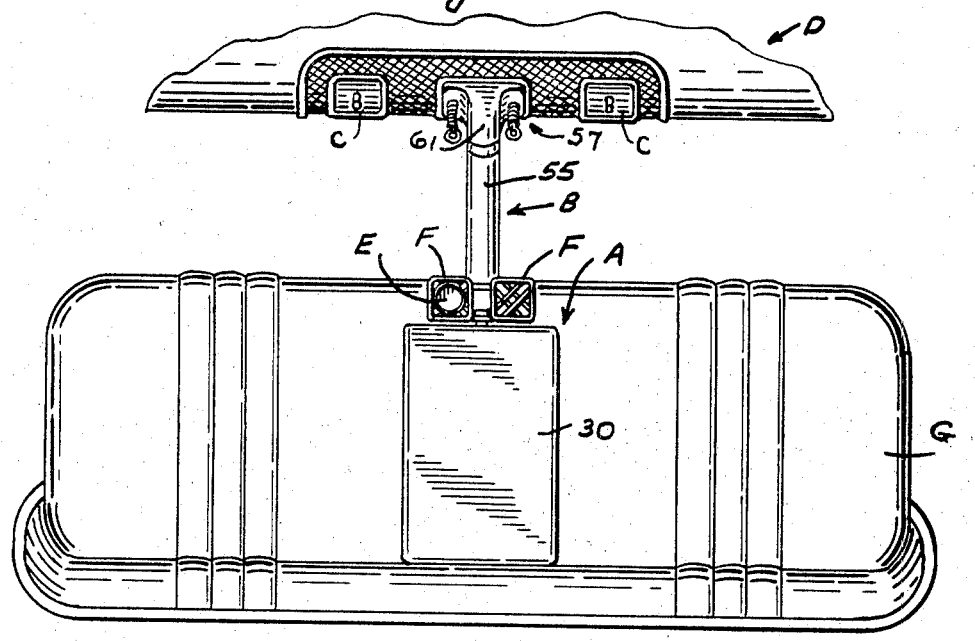
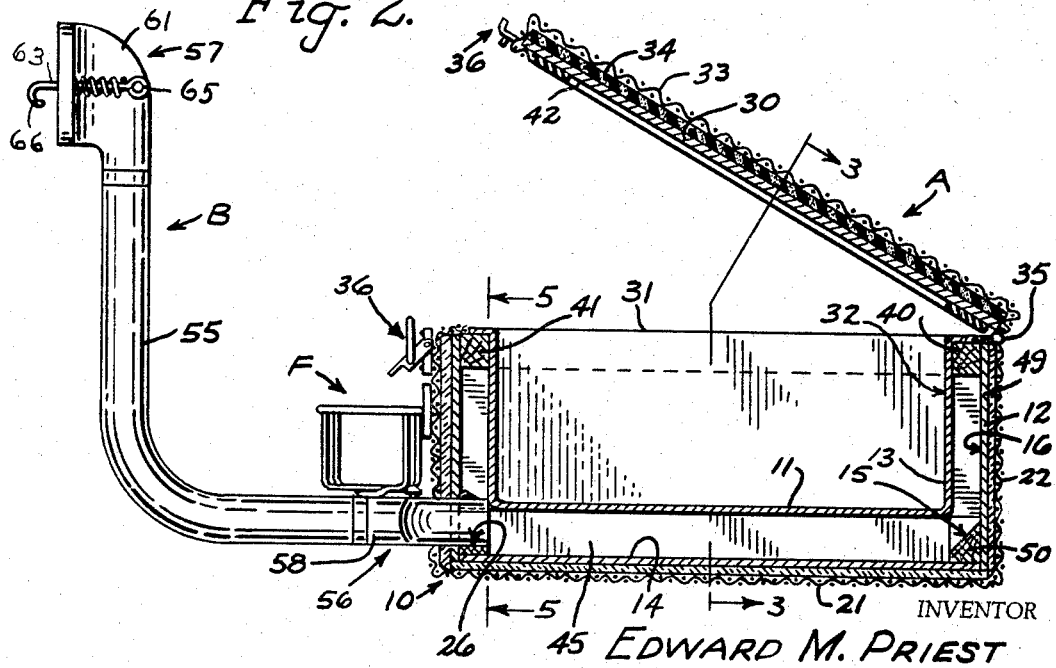
INVENTOR
EDWARD M. PRIEST
BY
ATTORNEYS Nov. 12, 1968
E. M. PRIEST
3,410,337
RECEPTACLE FOR TEMPERATURE-CONDITIONING FOOD, DRINK AND THE LIKE BY REMOTELY INITIATED MEANS
Filed Aug. 20, 1965
2 Sheets-Sheet 2
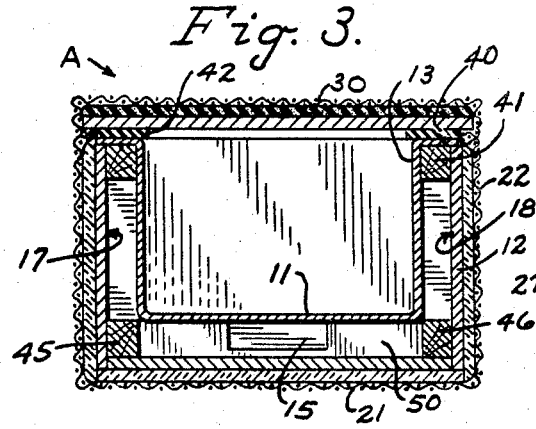
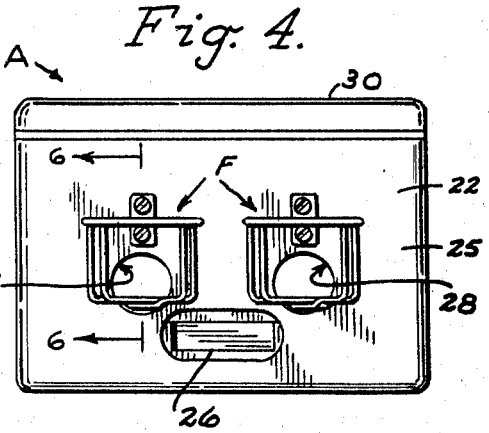
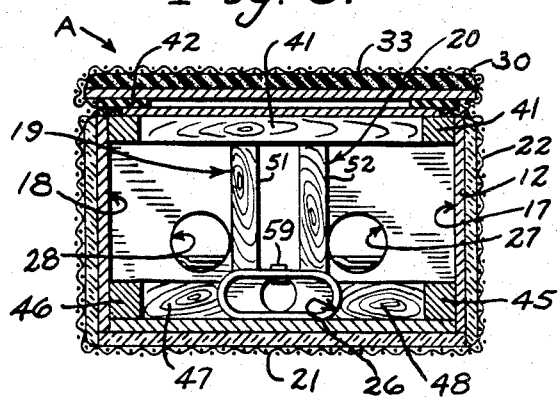
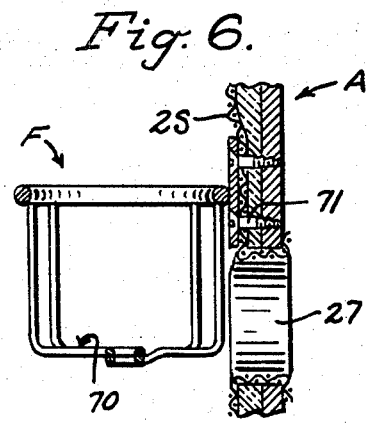
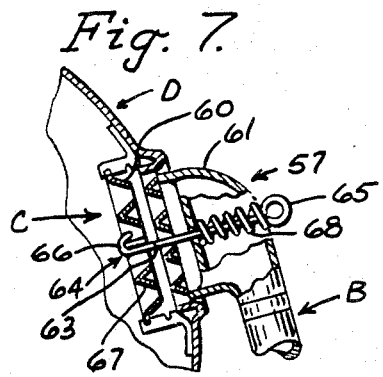
INVENTOR
EDWARD M. PRIEST
BY *Rommel, Allwein and Rommel*
ATTORNEYS

United States Patent Office 3,410,337
Patented Nov. 12, 1968

3,410,337
RECEPTACLE FOR TEMPERATURE-CONDITIONING FOOD, DRINK AND THE LIKE BY REMOTELY INITIATED MEANS
Edward Monroe Priest, 516–522 Tennessee Ave., Etowah, Tenn. 37331
Filed Aug. 20, 1965, Ser. No. 481,190
5 Claims. (Cl. 165—41)

This invention relates to receptacles for consumable materials, such as food or drink, which are to be maintained cool or warm by air conditioning means.

Important objects of the invention are to provide receptacles of the above named class (1) which are so constructed and arranged that there will be positive circulation of the conditioned air in order to maintain the consumable materials therein cool or warm; (2) which are readily coupled to the air conditioning means of a motor vehicle for example without any alterations to the conventional body structure of the vehicle; (3) which may be portable so that they can be moved to various locations in the vehicle, such as upon a seat thereof; (4) which function additionally as arm rests when disposed upon a vehicle seat; (5) which additionally function to cool or warm beverages, for example, the containers of which being supported outwardly of the receptacle and within easy reach; (6) which are relatively inexpensive to manufacture; (7) which take up but small space in dealers' showrooms or when stored; and (8) which are of sturdy construction.

Other objects and advantages of the invention will be apparent during the course of the following detailed description of the invention taken in connection with the accompanying drawings, forming portions of the disclosure, and in which drawings:

FIG. 1 is a top plan view of the invention showing the receptacle disposed upon a portion of a vehicle seat and operatively connected to a conventional conditioned air outlet in the instrument panel of the vehicle, the receptacle supporting a beverage container in an out-of-the-way position.

FIG. 2 is a vertical longitudinal sectional view of the receptacle of FIG. 1 with a lid thereof raised and including an operative connection with an air conditioning means.

FIG. 3 is a central transverse sectional view substantially on the line 3—3 of FIG. 2 but with the lid closed.

FIG. 4 is a front end elevational view of the receptacle.

FIG. 5 is a transverse vertical sectional view substantially on the line 5—5 of FIG. 2.

FIG. 6 is a fragmentary enlarged transverse vertical sectional view substantially on the line 6—6 of FIG. 4.

FIG. 7 is a view partly in side elevation and partly in vertical section of connecting means.

In the drawings, wherein for the purpose of illustration is shown a preferred embodiment of the invention and wherein similar reference characters designate corresponding parts throughout the several views, the letter A generally designates the receptacle; B, means for connecting it with the air-conditioning means C of a vehicle D for example; E, a container supported by one of the brackets F carried by the receptacle A; and G, a seat.

The receptacle A includes spaced-apart outer and inner bottom walls 10 and 11 respectively, and outer and inner upstanding walls 12 and 13 respectively, defining, with baffles hereinafter detailed, a plurality of conditioned air passageways 14 to 20 therebetween. The outer walls 10 and 12 may be of laminated construction and include outer decorative covering 21 and 22, such as of imitation leather, for example. These walls define a housing with an upper mouth.

A first or front portion 25 of the upstanding wall 12 is provided with a conditioned air intake port 26 preferably disposed with its center upon the longitudinal central axis of the receptacle A and adjacent the bottom wall 10 but preferably below the horizontal place of the bottom wall 11, as may be seen in FIG. 2. This wall portion 25 is also provided with a suitable number of conditioned air exhaust ports, such as the two ports 27 and 28, preferably positioned as in FIGS. 4 and 5. A lid or closure 30 for the receptacle A closes the mouth 31 of the compartment 32 defined by the inner walls 11 and 13 and lid 30. The lid may be of laminated construction and include an outer covering 33 similar to that of the upstanding outer wall 12. It may also include a resilient padding lamina 34 immediately below the outer covering 33, thus providing a comfortable arm rest when the lid is closed. The lid may be hinged, as at 35 in FIG. 2, to the upstanding outer wall 10, and provided with a suitable closure-fastener means 36, such as a conventional hook-link-and-lever latch in order to retain the lid tightly closed.

The inner walls 11 and 13 may be of metal or hardened plastic, by way of example. Extending outwardly from the upper edge of the upstanding wall 13 is a horizontal flange 40 seated upon an inwardly-extending horizontal combined flange and baffle 41, projecting from the inner face of the upstanding wall 10. Upon the bottom face of the lid of closure 30 may be disposed a cushioning and sealing gasket 42. The baffling effects of the combined flange and baffle 41 will be subsequently described.

The disposition of the conditioned air passageways 14 to 20 inclusive, in conjunction with baffle means for the conditioned air is important. It will be noted, from FIGS. 2 and 3, that the conditioned air from the intake port 26 flows unimpeded directly over the entire inner bottom wall 11, through the passageway 14 but cannot flow upwardly until it reaches the end of the receptacle A which is opposite the wall portion 25, first because of the two longitudinally-extending baffles 45 and 46 (shown in FIGS. 2, 3 and 5) and the two transversely-extending baffles 47 and 48 (shown in FIG. 5), and second because the junctures of the walls 11 and 13 contact the corners of the baffles 45 to 48 inclusive, as shown in FIGS. 2 and 3. Thus, the coolest or warmest (as the case may be) of the conditioned air flowing through the receptacle A tends to cool or heat the entire bottom wall 11 upon which the consumable material or the containers thereof rest. There are no baffles nor supports for the bottom wall 11 to lessen conduction through the wall 11.

Along the lower end of another or second portion 49 of the outer upstanding wall 12, opposite the portion 25, is a baffle 50, the corner of which also contacts the juncture of the walls 11 and 13 and so baffles the conditioned air upwardly therealong to strike the bottom wall 11. However, the baffle 50 is provided with a restricted or second passageway 15 (shown in FIGS. 2 and 3) which extends upwardly at an angle, such as substantially 45 degrees, by way of example, and tends to direct the conditioned air from the passageway 14 upwardly in a jet to a passageway 16, where the jet fans out, but is baffled by the portion of the combined flange and baffle 41 and, after flowing over the adjacent portions of the inner upstanding wall 13, enters the two passageways 17 and 18 (FIGS.

3 and 5) flowing over the adjacent portions of the inner upstanding wall 13 and, thereafter, enters and flows through the two passageways 19 and 20 (FIG. 5), being stopped by the two upstanding baffles 51 and 52 which block the emerging conditioned air from entering the passageways 19 and 20 and also baffle the conditioned air in these passageways to exit from the ports 27 and 28, whereupon the conditioned air impinges upon any container or containers E, interposed in the flow of conditioned air and enters the vehicle's passenger compartment in order to supplement the cooling or heating thereof.

By the term "restricted passageway" is meant one which, for example, has an intake mouth width ratio, compared to the ratio of the width of the passageway 14, of substantially 1:5, although this may vary slightly.

The means B for connecting the conditioned air intake port 26 with the air conditioning means C of a motor vehicle D for example may be a length of conventional flexible air-tight tubing 55 with a suitable coupling means 56 at the outer end thereof for connection with the intake port 26 and a suitable coupling means 57 at the intake end thereof for coupling to a conventional exhaust port structure 60 of the air conditioning means C of the vehicle D. The coupling means 56 may include a conventional collar 58 with a detent 59 to releasably retain the collar 58 firmly to the intake port 26 but the coupling means 57 is preferably of the structure shown in FIG. 7 wherein a hood 61 covers the mouth of a selected conditioned air exhaust port structure 60 of the air conditioning means C, such as, for example, shown in U.S. Patent 2,817,282, dated Dec. 24, 1957, for Automobile Passenger Cooling System, wherein directional vanes are provided. Slidably extending through suitable spaced-apart perforations in the hood 61 are the shanks 63 of hooks 64 with the outwardly-extending portions of the hooks 64 being provided with hand grips 65 and the inner ends of the hooks having bills 66 to engage the directional vanes 67, while the hooks are biased by expansion coil springs 68 as shown in FIG. 7. Thus, no alterations to a conventional motor vehicle is necessary in order to attach the receptacle A thereto, whether equipped with an air cooling system, an air heating system, or both, or a reverse cycle air cooling-heating system is provided for the vehicle, just so a suitable conditioned air exhaust port with directional vanes forms a part of the vehicle. However, the means shown in FIG. 7 is included simply by way of example, since other means may be provided without changing the form or function of the receptacle A.

Referring mainly to FIGS. 4 and 6, the brackets F are provided as means to detachably support containers E of beverages, such as drinking glasses, bottles and the like. They are preferably conventional wire or hardened plastic brackets having sockets 70 for the purpose, carried by and to project outwardly from the wall portion 25, as by screws 71. However, as may be seen in FIG. 4, they are so disposed that the full force of the conditioned air, emerging from the exhaust ports 26 and 27, will be concentrated upon the containers E, principally upon the lower ends thereof, whereby the beverages therein will be kept cool or warm, as the case may be.

The restriction of the conditioned air by the restricted passageway 15 in the baffle 50 will tend to slow the flow of the air over the inner bottom wall 13, thus causing a more lengthy thermal exchange effect so as to better cool or heat the contents of the compartment 32, since at least a portion of the contents must, of necessity, stand directly upon this wall.

The various baffles may be of wood or hardened plastic material for economy of manufacture. During storage, shipping, and the like, the tubing 55 and its accessories of the means B may be housed in the compartment 32 of the receptacle A.

Various changes in the size, shape and arrangement of parts may be made to the form of invention herein shown and described, without departing from the spirit of the invention or scope of the following claims.

What is claimed is:

1. A receptacle for consumable materials, such as food and drink, including spaced apart bottom and upwardly extending inner and outer walls and baffles therebetween all defining passageways between said walls, an outer front portion of said upstanding outer wall being provided with spaced apart intake and exhaust ports; a lid, defining with said inner walls, a compartment for said consumable materials, means for connecting said intake port with the air conditioning means of a vehicle for the flow of conditioned air through said intake port and passageways and out of said exhaust port, said baffles including a baffle disposed upon said bottom wall and against the inner face of another portion of said upstanding outer wall and in overlying relationship with said exhaust port opposite the first-named portion, and being provided with one of said passageways, said one of said passageways having an intake mouth restricted in width over the widths of the other passageways and positioned to deflect conditioned air upwardly into another of said passageways.

2. A receptacle according to claim 1 characterized in that said one of said passageways has an inclined floor extending upwardly from said bottom wall to said another portion of said upstanding outer wall and to said another of said passageways.

3. A receptacle for consumable materials, such as food and drink, including outer bottom and upstanding walls; inner bottom and upstanding walls within the area defined by said outer walls and spaced therefrom, said bottom and upstanding walls being joined together to provide corners; a lid providing a closure for said receptacle and defining, with said inner walls, a compartment for said consumable materials; baffles in the spaces between said inner and outer walls and defining passageways with said inner and outer walls, a flange extending outwardly from the upper ends of said inner upstanding outer walls; and an inwardly-extending flange carried by said outer upstanding walls supporting said inner upstanding walls upon said outer upstanding walls; said outwardly-extending flange having an intake port to said passageways and an exhaust port from said passageways; and means for connecting said intake port with the air conditioning means of a vehicle for the flow of conditioned air through said intake port and passageways and out of said exhaust port.

4. A receptacle for consumable materials, such as food and drink, including outer bottom and upstanding walls defining a housing with an upper opening; an inner bottom wall and upstanding wall joined thereto, within and spaced from the walls of said housing and supported at the upper ends of said inner upstanding wall by the outer upstanding wall; a lid, defining with said inner walls a compartment for consumable material; one portion of said said outer upstanding wall being provided with a conditioned air intake port and a conditioned air exhaust port adjacent thereto; baffles within the spaces between said inner and outer walls and defining with said inner and outer walls a plurality of conditioned air passageways, including a first passageway from said intake port over the underside of the entire inner bottom wall, an upwardly extending passageway, a restricted passageway from said first passageway to said upwardly extending passageway, and passageways from said upwardly extending passageway to said exhaust port; one of said baffles being disposed between the passageway from said intake port and the passageway to said exhaust port and between said one portion of said outer upstanding wall and the facing portion of said inner upstanding wall.

5. A receptacle for consumable materials, such as food and drink, including spaced apart bottom and upwardly extending inner and outer walls and baffles therebetween, all defining passageways between said walls, a first portion of said upstanding outer wall being provided with spaced apart intake and exhaust ports; a lid, defining with said inner walls, a compartment for said consumable materials; means for connecting said intake port with the air conditioning means of a vehicle for the flow of conditioned air through said intake port and passageways, over said baffles and out of said exhaust port; and support means carried outwardly by said outer upstanding wall for detachably supporting a drink container in a position whereby the conditioned air from said exhaust port will impinge against said container.

References Cited
UNITED STATES PATENTS

| | | | |
|---|---|---|---|
| 1,693,249 | 11/1928 | Pauly | 165—169 |
| 2,137,676 | 11/1938 | Martin | 165—72 |
| 3,164,971 | 1/1965 | Gentz | 62—406 |
| 3,280,896 | 10/1966 | Goodson et al. | 165—43 |

ROBERT A. O'LEARY, *Primary Examiner.*

CHARLES SUKALO, *Assistant Examiner.*